(No Model.)
I. S. COVELL.
BICYCLE LOCK AND SUPPORT.
No. 595,605. Patented Dec. 14, 1897.
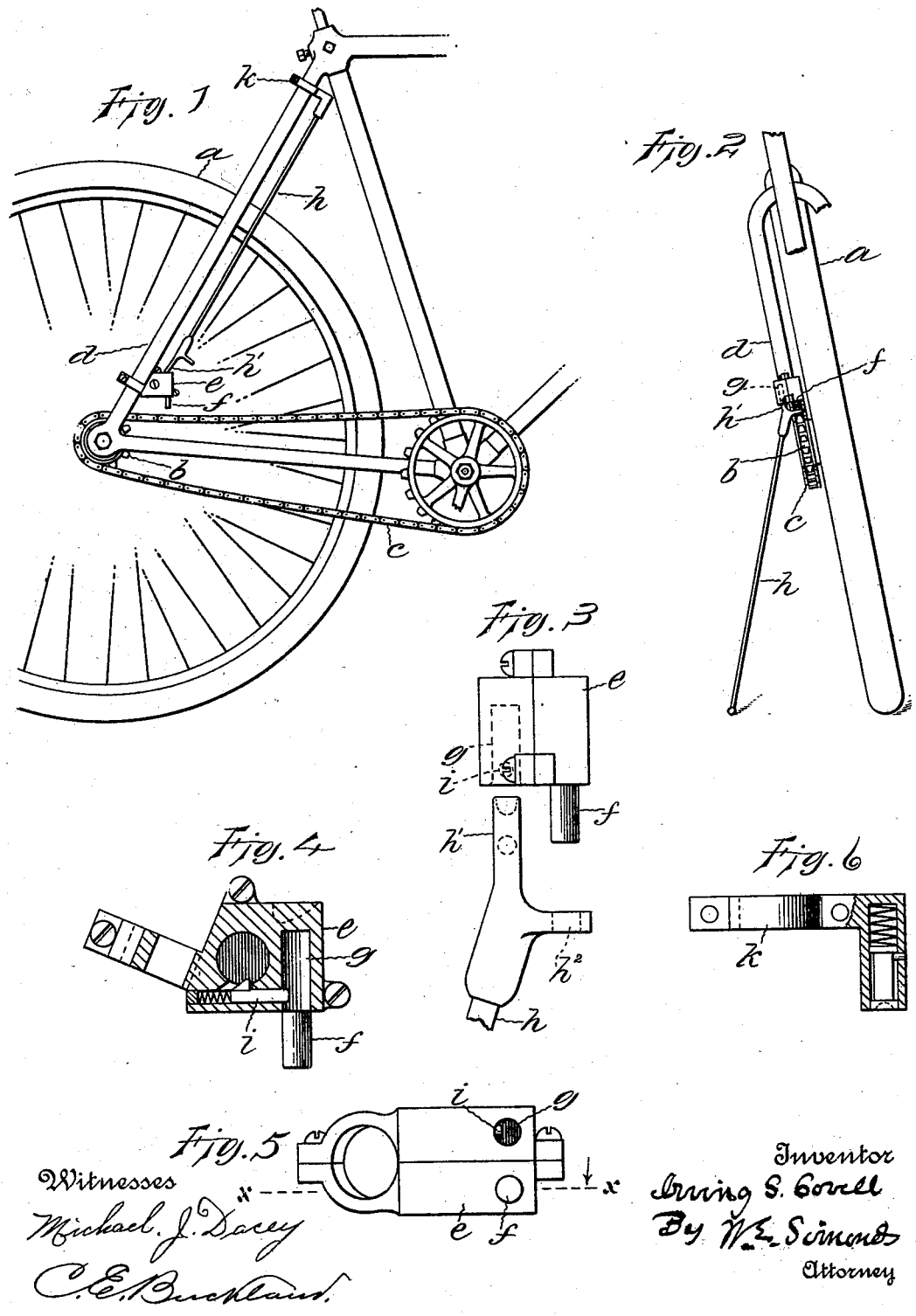
Witnesses
Michael J. Darcy
C. E. Buckland
Inventor
Irving S. Covell
By W. E. Simonds
Attorney

UNITED STATES PATENT OFFICE.

IRVING S. COVELL, OF HARTFORD, CONNECTICUT.

BICYCLE LOCK AND SUPPORT.

SPECIFICATION forming part of Letters Patent No. 595,605, dated December 14, 1897.

Application filed March 13, 1897. Serial No. 627,303. (No model.)

*To all whom it may concern:*

Be it known that I, IRVING S. COVELL, a citizen of the United States of America, residing at Hartford, in the county of Hartford and State of Connecticut, have invented a certain new and useful Bicycle Lock and Support, of which the following is a description, reference being had to the accompanying drawings, wherein—

Figure 1 is a side elevation view of the rear portion of a bicycle embodying said improvement. Fig. 2 is a front elevation view of the greater portion of the parts shown in Fig. 1. Fig. 3 is a detail view, on an enlarged scale, of the parts immediately concerned in gripping and locking the chain. Fig. 4 is a detail view, on an enlarged scale, of the part forming the upper piece in Fig. 3. It is in the nature of a sectional view from front to rear on the plane denoted by the dotted line $x\ x$ of Fig. 5. Fig. 5 is a detail plan view, on an enlarged scale, of the part forming the upper piece in Fig. 3. Fig. 6 is a detail side view, on an enlarged scale, of a certain spring-catch, hereinafter described. The barrel of the spring-catch is shown in central vertical section.

The object and purpose of the improvement is the production of a device which at the pleasure of the rider can be made to grip and lock the chain of a bicycle against motion and at the same time form a support for holding the bicycle in a nearly upright position.

In the accompanying drawings the letter $a$ denotes a bicycle-wheel, the rear wheel. The letter $b$ denotes a sprocket-wheel fixedly attached to said bicycle-wheel through the medium of a shaft common to both. The letter $c$ denotes an ordinary bicycle-chain adapted to drive said sprocket from the ordinary sprocket-wheel upon the pedal-shaft. The letter $d$ denotes one of the halves of the rear fork, wherefore it is called a "fork-half." It rises from the shaft of the said rear bicycle-wheel. The letter $e$ denotes a piece fixedly attached to said fork-half, as by an encircling band and screw. This piece carries the pin $f$. It also carries a socket $g$.

The letter $h$ denotes a leg separate and separable from the other parts of the bicycle, which when in place, as seen in Fig. 2, extends obliquely outward and is adapted to afford a support for the entire machine in a position slightly deviating from the perpendicular. This leg $h$ carries a pin $h'$, fitting into the socket $g$, and it also carries a socket $h^2$, adapted to receive therein the pin $f$. When the two sockets and two pins are engaged, as shown in Fig. 2, they are adapted for gripping the chain $c$ between them, and in that adjustment the pin $f$ pierces or passes through one of the links of the chain, an arrangement which holds the chain, and consequently the bicycle, against the ordinary progressive motion. The piece $e$, bearing pin and socket, as already described, is also provided with a lock to be operated by a key in the ordinary manner. The letter $i$ denotes the bolt of that lock. By means of this lock the pin $h'$ can be locked into the socket $g$ until the key is used to unlock the same.

The letter $k$ denotes a spring-catch attached higher up on the fork-half $d$. It is adapted to receive and hold one end of the leg $h$, the other end thereof resting in a suitable seat made for it in the top of the piece $e$.

In the ordinary use of the bicycle the leg $f$ is carried in the position just indicated. When the rider would leave his machine, he takes the leg $h$ from the grasp of the spring-catch and engages the pins and sockets $f\ h'\ g\ h^2$ with the chain, as already described, and he may, if he pleases, lock the parts in this position by means of the lock already referred to.

I claim as my improvement—

1. In combination, the bicycle-wheel, the sprocket-wheel fixedly attached to said bicycle-wheel, the endless chain adapted to drive said sprocket-wheel, the fork-half rising from the shaft of said bicycle-wheel, the piece bearing pin and socket attached to said fork-half, and the separable obliquely-extending leg equipped with corresponding pin and socket adapted to coöperate with the first-mentioned pin and socket in grasping the chain, all substantially as described and for the purposes set forth.

2. In combination, the bicycle-wheel, the sprocket-wheel fixedly attached to said bicycle-wheel, the endless chain adapted to drive said sprocket-wheel, the fork-half rising from the shaft of said bicycle-wheel, the piece bearing pin and socket attached to said fork-half, the separable obliquely-extending leg equipped with corresponding pin and socket adapted to coöperate with the first-mentioned pin and socket in grasping the chain, and the lock for the last-mentioned pin, all substantially as described and for the purposes set forth.

3. In combination, the bicycle-wheel, the sprocket-wheel fixedly attached to said bicycle-wheel, the endless chain adapted to drive said sprocket-wheel, the fork-half rising from the shaft of said bicycle-wheel, the piece bearing pin and socket attached to said fork-half, the separable obliquely-extending leg equipped with corresponding pin and socket adapted to coöperate with the first-mentioned pin, and the spring-catch attached to the upper part of said fork-half, all substantially as described and for the purposes set forth.

IRVING S. COVELL.

Witnesses:
W. E. SIMONDS,
H. H. BATES.